W. KASSEBEER.
TRUCK.
APPLICATION FILED JULY 20, 1910.

1,012,649.

Patented Dec. 26, 1911.
2 SHEETS—SHEET 1.

Witnesses.
D. O. Edelin.
E. C. Schuermann.

Inventor:
William Kassebeer,
by Pennie Goldsborough & O'Neill
Attys.

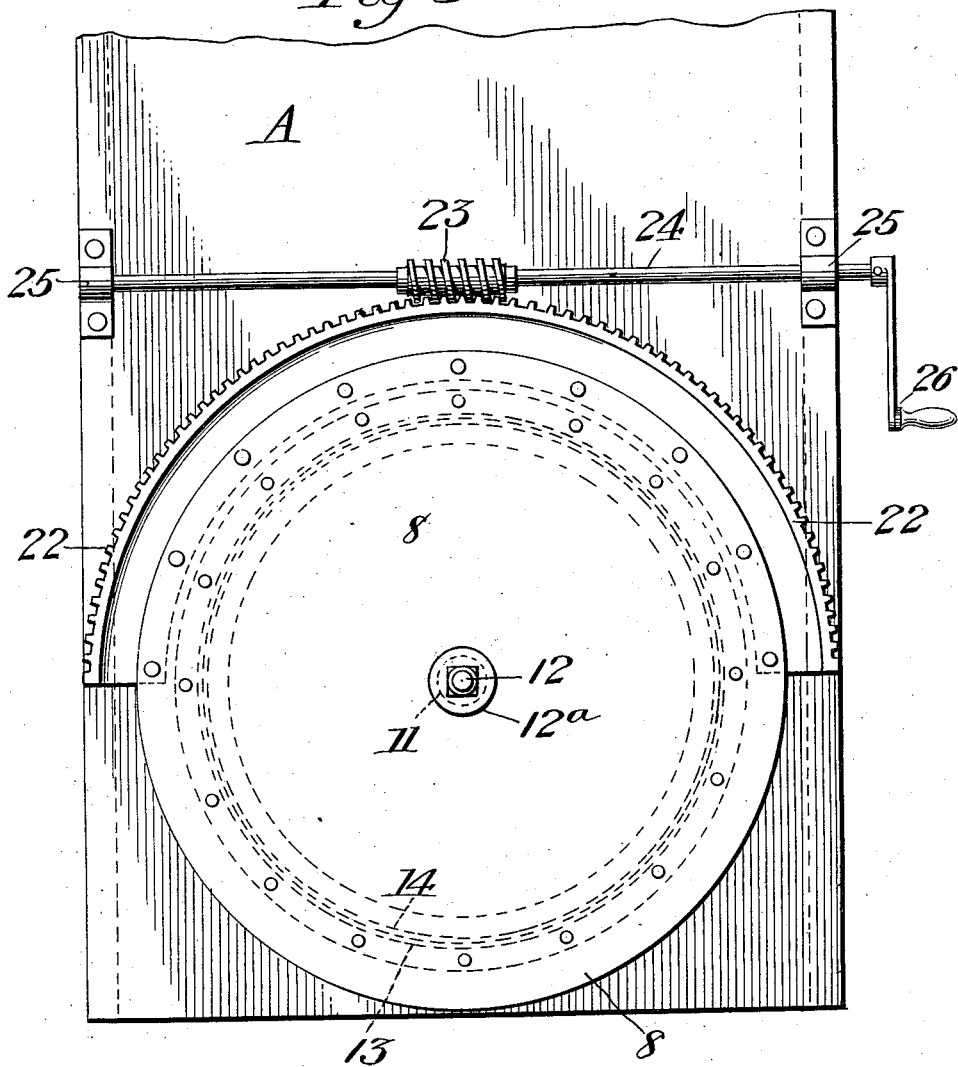

UNITED STATES PATENT OFFICE.

WILLIAM KASSEBEER, OF LIHUE, TERRITORY OF HAWAII.

TRUCK.

1,012,649.  Specification of Letters Patent.  Patented Dec. 26, 1911.

Application filed July 20, 1910. Serial No. 572,854.

*To all whom it may concern:*

Be it known that I, WILLIAM KASSEBEER, a subject of the German Emperor, and a resident of Lihue, in the county of Kauai, Territory of Hawaii, have invented certain new and useful Improvements in Trucks; and I do hereby declare the following to be a full, clear, and exact description of the invention, such as will enable others skilled in the art to which it appertains to make and use the same.

My invention relates to trucks, and particularly to trucks under the front end of drays, wagons and the like.

The object of my invention is to produce a truck of this class which is not only swiveled to turn on the king bolt, but is so designed that its wheels may be at different elevations without tilting the platform of the wagon when the truck is turned in any position about the king bolt.

The invention consists in the construction, arrangement and combination of parts, hereinafter described and claimed, reference being had to the accompanying drawing forming a part of this specification, in which—

Figure 1:
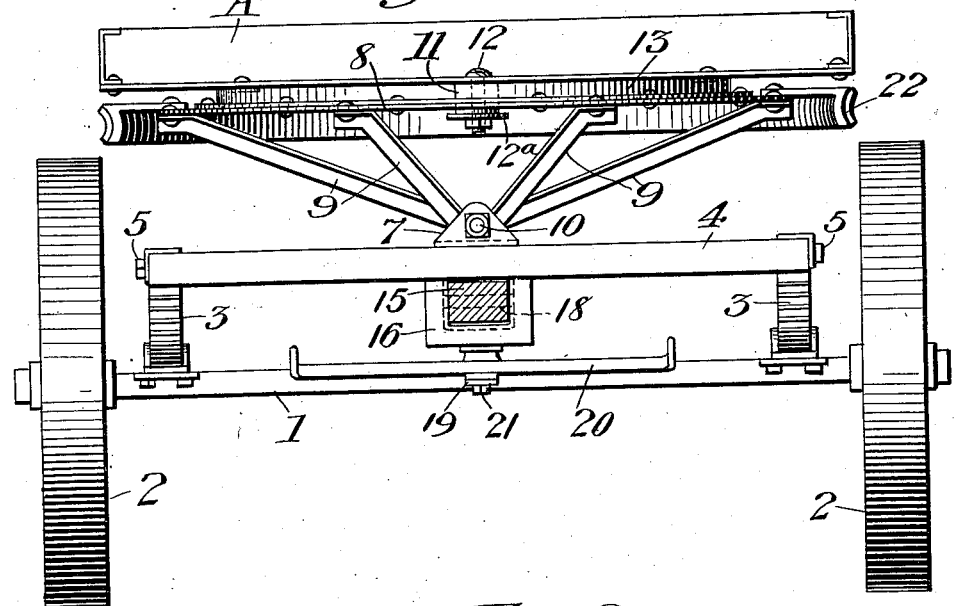
Figure 2:
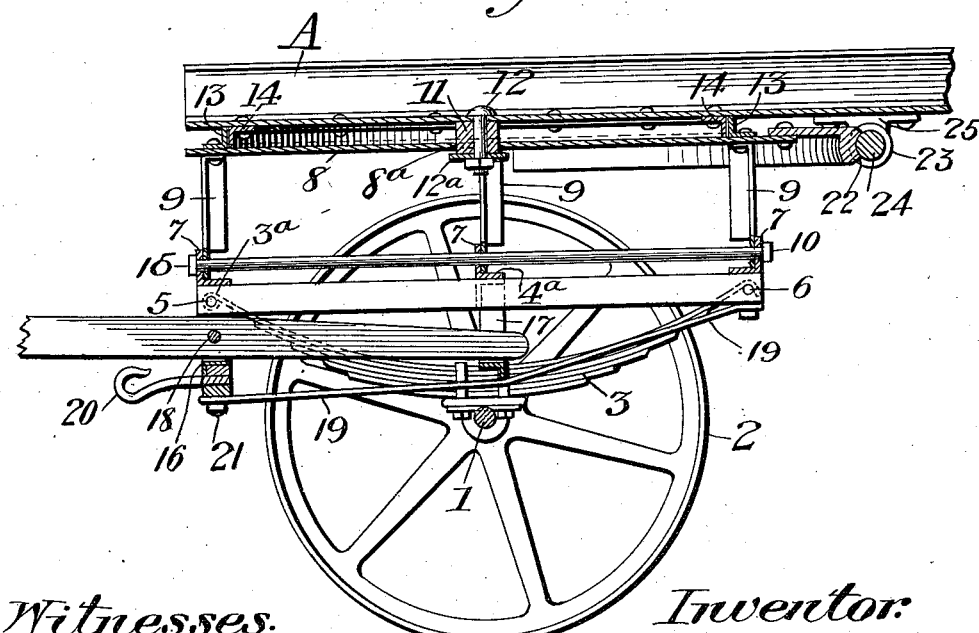

Figure 1 represents a front view of a truck embodying my invention. Fig. 2 is a side elevation of the same. Fig. 3 is an inverted plan view of a portion of the truck, with certain parts omitted.

The axle 1 is provided with two suitable wheels 2 and with two half-elliptic leaf springs 3 in a well known manner. The front ends of the springs 3 are provided with eyes $3^a$. A rectangular shaped frame 4, preferably of angle iron construction, is supported upon the springs 3, by bolts 5 which pass through the two front corners of said frame and through the eyes $3^a$, while the rear ends of said springs engage and slide on the under side of said frame near its two rear corners. The bolts 6 prevent the rear end of the frame 4 from lifting off from the rear ends of the springs 3. The frame 4 is provided with a member $4^a$ transversely disposed near its center. Three lugs 7 are secured above the centers of the front and rear ends of the frame 4 and above the center of the member $4^a$ respectively.

A circular plate 8 is provided with three V shaped braces 9 of angle iron or plate riveted to the under side of said plate 8 and a hinge bolt 10 passes through the lower portion of each of the braces 9 and through the lugs 7, as shown. A sleeve 11 is secured to the under side of the platform A of the wagon or the like. The lower end of the sleeve 11 projects slightly through a hole $8^a$ in the center of the plate 8. The king bolt 12 is passed through the platform A and the sleeve 11 and clamps the washer $12^a$ to the lower end of said sleeve. The plate 8 can be turned about the sleeve 11, while the washer $12^a$ prevents the accidental withdrawal of the sleeve 11 from the plate 8. A ring 13 is concentrically secured to the upper side of the plate 8, and is adapted to turn with said plate. A slightly smaller ring 14 is secured to the under side of the platform A, and is adapted to engage and guide the ring 13.

When the truck is to be used for wagons or the like which are to be drawn, by horses for example, a pole 15 is provided. Two U shaped pieces 16, 17, which may be made of angle iron bent as shown, are secured to the centers of the front end of the frame 4 and the member $4^a$ respectively and depend therefrom. The rear end of the pole 15 is inserted in the U pieces 16 17, and a bolt 18 is passed horizontally through the front U piece 16 and the pole 15. The rear end of the pole 15 is tapered on its upper side, so that the pole may move slightly in a vertical plane on the bolt 18 as a pivot, its movement being limited by the rear U piece 17 and the member $4^a$. The pole 15 can be turned horizontally only with the frame 4. The lower ends of the U pieces 16 17 may be connected by a brace 19 to the rear end of the frame 4 (Fig. 2) and a swingletree 20 is provided to turn on the bolt 21 between the U piece 16 and the brace 19.

When the truck is to be used with a motor driven wagon or the like, a steering device may be added. For example, a segment of a worm gear 22 may be secured to the plate 8 to mesh with a worm 23 secured to a shaft 24 journaled in boxes 25 bolted to the platform A. The shaft 24 may be turned in any suitable manner, for example by a crank 26, Fig. 3.

I claim:

The combination with a wheeled axle, and springs associated with the axle, of a rectangular frame supported on said springs, perforated lugs rising from the front and rear ends respectively of said frame, a third perforated lug rising from the middle portion of the frame, a plate above said lugs, a plurality of downwardly converging braces formed of angle irons depending from said plate, said braces being arranged in groups at the front and rear of said plate and also at the middle, corresponding in position with the aforesaid lugs, and having their lower ends adjacent the corresponding lugs, a bolt passing through all of the lugs and through the lower ends of all of the braces, and a platform above said plate and swiveled to the same.

In testimony whereof I affix my signature, in presence of two witnesses.

WILLIAM KASSEBEER.

Witnesses:
  ROBT. J. PRATT,
  P. H. BURNETTE.